(12) United States Patent
Kanoh (10) Patent No.: US 7,899,133 B2
(45) Date of Patent: Mar. 1, 2011

(54) RECEIVING SYSTEM

(75) Inventor: Takashi Kanoh, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1130 days.

(21) Appl. No.: 11/563,091

(22) Filed: Nov. 24, 2006

(65) Prior Publication Data

US 2007/0121008 A1    May 31, 2007

(30) Foreign Application Priority Data

Nov. 29, 2005  (JP) ................................ 2005-344028

(51) Int. Cl.
*H03K 9/00* (2006.01)

(52) U.S. Cl. .................... 375/316; 370/395.62; 370/503; 398/155

(58) Field of Classification Search ........................ None
See application file for complete search history.

(56) References Cited

U.S. PATENT DOCUMENTS

| 6,914,637 | B1 | 7/2005 | Wolf et al. | |
| 7,389,318 | B2* | 6/2008 | Yoshida et al. | 709/200 |
| 2004/0252235 | A1 | 12/2004 | Ejima | |
| 2005/0058158 | A1* | 3/2005 | Miyamoto | 370/503 |

FOREIGN PATENT DOCUMENTS

| CN | 1631035 A | 6/2005 |
| JP | 2002-165148 | 6/2002 |
| JP | 2005-514836 | 5/2005 |
| WO | WO 02/45415 A1 | 6/2002 |

* cited by examiner

*Primary Examiner* — David C Payne
*Assistant Examiner* — Adolf Dsouza
(74) *Attorney, Agent, or Firm* — Oblon, Spivak, McClelland, Maier & Neustadt, L.L.P.

(57) ABSTRACT

A receiving system includes: FIFO memory 13 storing audio data AD contained in a transmission signal T; an extraction unit 14 configured to extract a clock parameter contained in the transmission signal T; a parameter change unit 152 configured to change the clock parameter in accordance with a result of a comparison between a data storage rate SR of the FIFO memory 13 and a predetermined value; a frequency setting unit 153 configured to set a read frequency fr using the changed clock parameter; and a data read unit 16 configured to read the audio data AD from the FIFO memory 13 in synchronization with a reception end audio clock signal AC of the read frequency fr.

4 Claims, 4 Drawing Sheets

RECEIVING SYSTEM

CROSS-REFERENCE TO RELATED APPLICATIONS

This application is based upon and claims the benefit of priority from the prior Japanese Patent Application No. 2005-344028 filed on Nov. 29, 2005; the entire contents of which are incorporated herein by reference.

BACKGROUND OF THE INVENTION

1. Field of the Invention

The present invention relates to a receiving system of a data transfer, and more specifically to a receiving system for regenerating data included in a received signal using a parameter included in the received signal.

2. Description of the Related Art

Recently, in an equipment unit such as a television receiver (TV), a set top box (STB), a DVD player, etc., a high definition multimedia interface (HDMI) standard has become widespread. The HDMI standard adopts, in a physical layer, a digital visual interface (DVI) having a copy protection function of baseband digital contents outputted from the STB for receiving a digital broadcast, the DVD player, etc., and transmitting visuals and audio via a single cable. Especially, immediately before the entire conversion from an analog broadcast of a television broadcast to a digital broadcast, a data transmission in accordance with the HDMI standard (hereinafter referred to as an "HDMI transmission") has become widespread mainly by the TV having a large screen flat panel display such as a liquid display, a plasma display panel (PDP), etc.

In the HDMI transmission, a clock signal for audio data is not directly transmitted from a transmission system to a receiving system, and a parameter used in generating a clock signal for audio data (hereinafter referred to as a "clock parameter") is transmitted from the transmission system to the receiving system. The receiving system generates a clock signal for audio data using a clock parameter (refer to National Publication of International Patent Application No. 2005-514836 as an example). That is, the receiving system generates a clock signal having the same frequency as the clock signal for audio data used in the transmission system (hereinafter referred to as a "transmission end audio clock signal") using a clock parameter, and regenerates audio data in synchronization with the generated clock signal. A clock parameter is included in an audio clock regeneration (ACR) packet transmitted at video blanking intervals. A "video blanking interval" is a period in which a signal containing no image data is transmitted. A clock signal for audio data generated by the receiving system using a clock parameter is hereinafter referred to as a "reception end audio clock signal".

In the HDMI transmission, audio data is transmitted also in a packet at the video blanking intervals. The audio data transmitted to the receiving system is stored in the first-in first-out system memory (hereinafter referred to as "FIFO memory") of a buffer and other units, and then the audio data is read from the FIFO memory in synchronization with the reception end audio clock signal. As a result, the audio data is regenerated as continuous audio.

If the amount of audio data stored in the FIFO memory in a predetermined time period matches the amount of audio data read from the FIFO memory, then the data storage rate of the FIFO memory is kept constant. The "data storage rate" refers to a ratio of the amount of data actually stored to a total amount of data that can be stored in the FIFO memory.

However, when the storage rate at which the audio data is stored in the FIFO memory does not match the read rate at which the audio data is read from the FIFO memory, the amount of audio data stored in the FIFO memory does not match the amount of audio data read from the FIFO memory. That is, when the amount of audio data stored in the FIFO memory is larger than the amount of audio data read from the FIFO memory, the audio data transmitted from the transmission system cannot be stored in the FIFO memory, and an overflow of the FIFO memory occurs. On the other hand, when the amount of audio data stored in the FIFO memory is smaller than the amount of audio data read from the FIFO memory, the amount of audio data stored in the FIFO memory gradually decreases, the audio data cannot be read from the FIFO memory, and an underflow of the FIFO memory occurs. That is, when the storage rate does not match the read rate, the data storage rate of the FIFO memory fluctuates.

In addition, there are the cases in which the transmission of audio data is temporarily stopped by a fault and other reasons of the transmission system, and audio data is dropped by a transmission error. In these cases, although the storage rate matches the read rate, the amount of audio data stored in the FIFO memory of the receiving system suddenly decreases, and the data storage rate of the FIFO memory drops. If the data storage rate drops, and the storage rate matches the read rate, then the data storage rate of the FIFO memory does not recover. When an overflow or an underflow occurs by an extreme decrease of the amount of audio data stored in the FIFO memory, the regenerated audio data becomes discontinuous, thereby degrading the quality of the audio.

BRIEF SUMMARY OF THE INVENTION

According to an aspect of the present invention, a receiving system including: memory storing data contained in a transmission signal; an extraction unit configured to extract a clock parameter contained in the transmission signal; a parameter change unit configured to change the clock parameter in accordance with a result of a comparison between a data storage rate of the memory and a predetermined value; a frequency setting unit configured to set a read frequency using the changed clock parameter; and a data read unit configured to read the data from the memory in synchronization with a clock signal of the read frequency is provided.

According to another aspect of the present invention, a receiving system including: a reception decoder configured to receive and demodulate a transmission signal from a transmission system; a data separation unit configured to separate the signal demodulated by the reception decoder into image data, audio data, a transmission clock, and a packet including a clock parameter; an image data output unit configured to externally output the image data in synchronization with the transmission clock; a memory storing the audio data; an extraction unit configured to extract the clock parameter from the packet; a parameter change unit configured to change the clock parameter in accordance with the result of a comparison between a data storage rate of the memory and a predetermined value; a frequency setting unit configured to set a read frequency using the changed clock parameter; and a data read unit configured to read the audio data from the memory in synchronization with a clock signal of the read frequency is provided.

DETAILED DESCRIPTION OF THE INVENTION

Next, an embodiment of the present invention is explained below by referring to the attached drawings. In the descriptions on the drawings, the same or similar portions are assigned the same or similar reference numerals.

Figure 1:
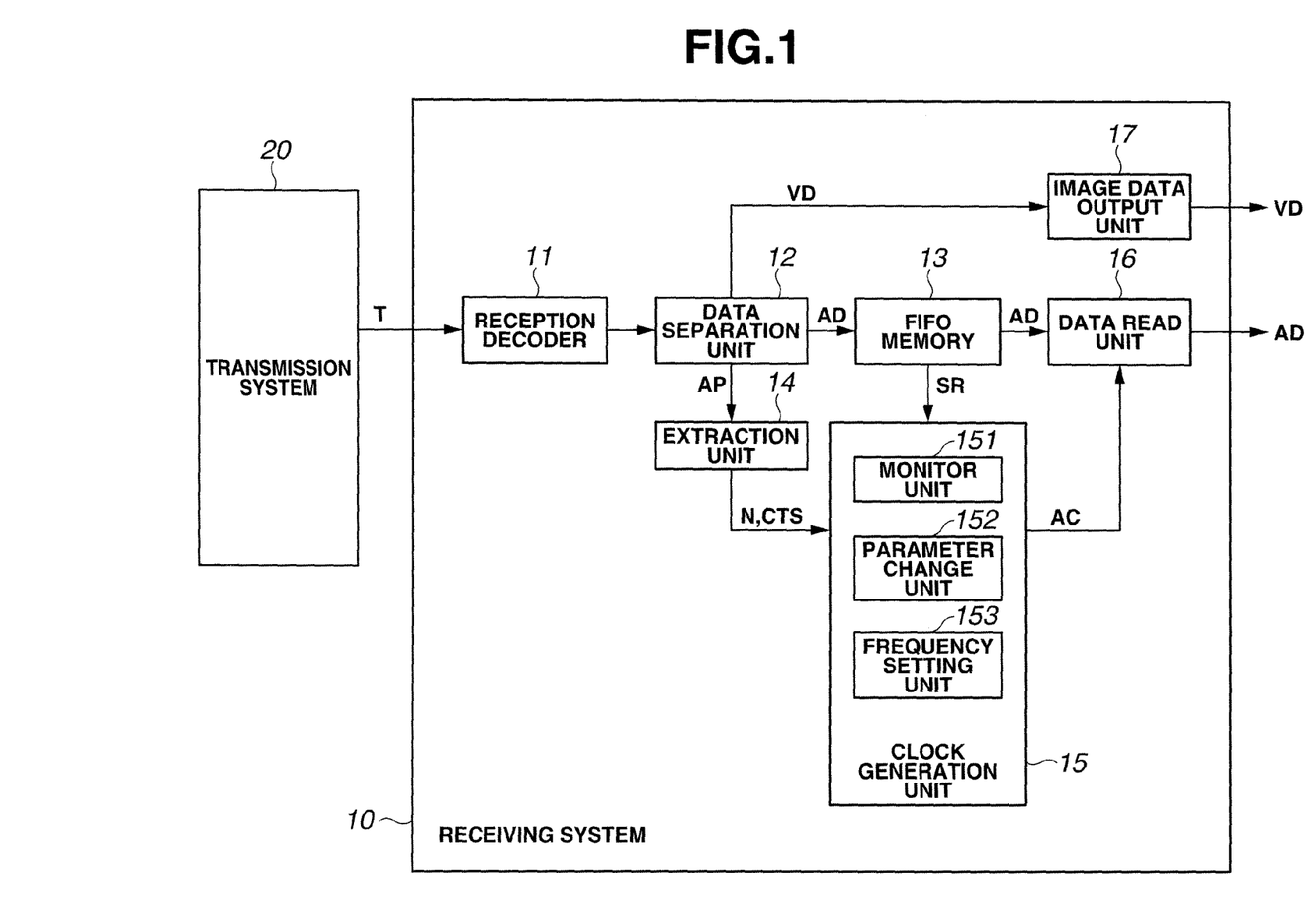
FIG. 1 is a schematic sectional view showing the configuration of the receiving system according to an embodiment of the present invention.

A receiving system 10 according to an embodiment of the present invention includes, as shown in FIG. 1: FIFO memory 13 storing audio data AD included in a transmission signal T; an extraction unit 14 configured to extract a clock parameter included in the transmission signal T; a parameter change unit 152 configured to change a clock parameter in accordance with a comparison between the data storage rate SR of the FIFO memory 13 and a predetermined value; a frequency setting unit 153 configured to set a read frequency fr using the changed clock parameter; and a data read unit 16 configured to read audio data AD from the FIFO memory 13 in synchronization with a reception end audio clock signal AC at the read frequency fr.

As shown in FIG. 1, a clock generation unit 15 includes the parameter change unit 152 and the frequency setting unit 153. A clock generation unit 15 further includes a monitor unit 151 configured to monitor the data storage rate SR of the FIFO memory 13. The parameter change unit 152 changes the clock parameter in accordance with the data storage rate SR of the FIFO memory 13. Practically, the parameter change unit 152 changes the clock parameter to raise the read frequency fr when the data storage rate SR is equal to or more than a predetermined upper limit, and to drop the read frequency fr when the data storage rate SR is equal to or less than a predetermined lower limit. In addition, the parameter change unit 152 changes the clock parameter using predetermined correction value having a constant ratio to the clock parameter. The parameter change unit 152 increases or decreases the clock parameter by the correction value with the correction value set to, for example, 0.01% of the clock parameter. A predetermined upper limit, a predetermined lower limit, and a correction value are stored in the receiving system 10. The clock generation unit 15 generates a reception end audio clock signal AC at the read frequency fr set using a changed clock parameter. The clock generation unit 15 transmits the reception end audio clock signal AC to the data read unit 16.

The receiving system 10 shown in FIG. 1 further includes a reception decoder 11, a data separation unit 12, and an image data output unit 17. The reception decoder 11 demodulates a transmission signal modulated corresponding to, for example, a transition minimized differential signaling (TMDS) and other systems. The data separation unit 12 separates the data included in the transmission signal T into image data VD, audio data AD, and an ACR packet AP. Although the corresponding drawing is omitted here, the data separation unit 12 transfers the transmission clock signal at the frequency fc included in the transmission signal T to the image data output unit 17 and the clock generation unit 15. The image data output unit 17 outputs the image data VD included in the transmission signal T in synchronization with the transmission clock to the outside of the receiving system 10.

The receiving system shown in FIG. 1 can be adopted as a receiving system of, for example, the HDMI transmission. Described below is an example of a case in which a transmission system 20 is a transmission system of the HDMI transmission. Assume that the frequency of the transmission end audio clock signal is 128 times as high as the sampling frequency fs. The sampling frequency fs is used when the audio data AD transmitted as digital data to the receiving system 10 is changed from analog data to digital data.

In the HDMI transmission, a clock signal for audio signal is not directly transmitted from the transmission system 20 to the receiving system 10, but only the clock signal for an image signal is transmitted to the receiving system 10. Hereinafter, the clock signal for an image signal transmitted from the transmission system 20 to the receiving system 10 is described as a "transmission clock signal". The transmission system 20 transmits an ACR packet AP including the ratio N of the sampling frequency fs of the audio data AD to the frequency fc of the transmission clock signal and a variable CTS at the video blanking intervals. The variable CTS is a ratio of the cycle of the transmission end audio clock signal to the cycle of the transmission clock signal. That is, the transmission system 20 calculates the times of the cycle of the transmission end audio clock signal to the cycle of the transmission clock signal. The transmission system 20 stores the ratio N and the variable CTS in an ACR packet AP with the ratio N and the variable CTS set as clock parameters, and transmits the packet to the receiving system 10.

First, a method of the receiving system 10 generating a reception end audio clock signal AC using the ratio N and the variable CTS is explained below. For example, when the frequency of the transmission end audio clock signal is 128 times as high as the sampling frequency fs, the relationship among the ratio N, the variable CTS, the frequency fc of the transmission clock signal, and the sampling frequency fs is regulated by the equation (1) below.

$$fc/CTS = 128 \times fs/N \tag{1}$$

Generally, the sampling signal for sampling an audio data AD is asynchronous with the transmission clock signal, and each of the transmission clock signal and the sampling signal contains a jitter component. That is, the ratio N and the variable CTS are not always constant. Therefore, the receiving system 10 sets the read frequency fr by the equation (2) below using the variable CTS and the ratio N calculated by the transmission system 20 in real time.

$$fc/CTS = 128 \times fr/N \tag{2}$$

To set the frequency fr, the receiving system 10 generates a pulse, for example, a CTS frequency division pulse having a cycle a variable CTS times as high as the cycle of the transmission clock signal and an N frequency division pulse having a cycle a ratio N times as high as the cycle of the reception end audio clock signal AC. Then, the receiving system 10 sets the frequency fr of the reception end audio clock signal AC such that the frequency of the CTS frequency division pulse can match the frequency of the N frequency division pulse.

Figure 2:
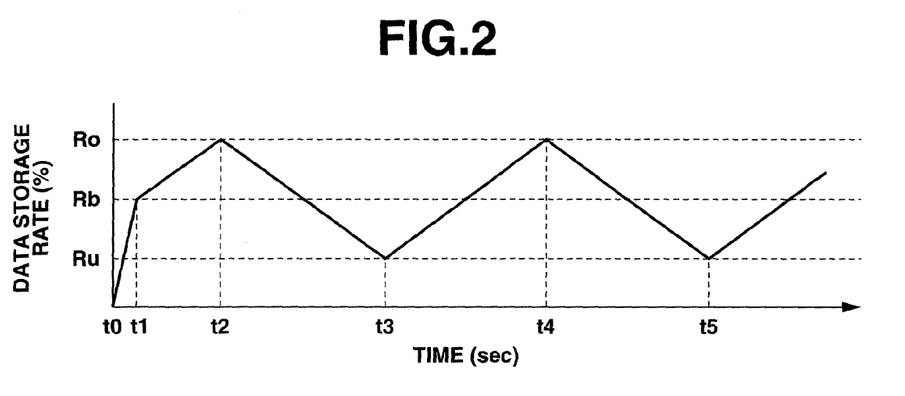
FIG. 2 is a timing chart for explanation of an example of an operation of the receiving system according to an embodiment of the present invention.

An example of an operation of the receiving system 10 shown in FIG. 1 is explained by referring to the timing chart shown in FIG. 2. In the following example, the transmission signal T in accordance with the HDMI standard is transmitted from the transmission system 20 to the receiving system 10. That is, in the example, the clock parameter has a ratio N and a variable CTS. In this example, the read rate determined by the read frequency fr calculated from an unchanged ratio N and variable CTS contained in the transmission signal T is lower than the storage rate at which the audio data AD is stored in the FIFO memory 13.

(a) At time t0 shown in FIG. 2, the transmission system 20 starts transmitting the transmission signal T to the receiving system 10. The transmission signal T is inputted to the reception decoder 11. The reception decoder 11 demodulates a TMDS-modulated transmission signal T, for example. The demodulated transmission signal T is inputted to the data separation unit 12. The data separation unit 12 separates the image data VD, the audio data AD, and the ACR packet AP from the transmission signal T. The separated image data VD is transferred to the image data output unit 17. The separated audio data AD is stored in the FIFO memory 13. The separated ACR packet AP is transferred to the extraction unit 14. The extraction unit 14 extracts the ratio N and the variable CTS from the ACR packet AP transferred from the data separation unit 12. The ratio N and the variable CTS are transferred to the clock generation unit 15. The frequency setting unit 153 provided for the clock generation unit 15 sets the read frequency fr by the equation (2) using the ratio N, the variable CTS and the frequency fc of the transmission clock signal.

(b) At time t1, when the data storage rate SR of the FIFO memory 13 reaches a predetermined start value Rb, the clock generation unit 15 generates a reception end audio clock signal AC having the read frequency fr. The start value Rb is set to a value, for example, 50%. The clock generation unit 15 transmits a reception end audio clock signal AC to the data read unit 16. The data read unit 16 which receives the reception end audio clock signal AC starts reading the audio data AD stored in the FIFO memory 13.

(c) As described above, the read rate determined in accordance with the read frequency fr calculated from the unchanged rate N and variable CTS is lower than the storage rate. Therefore, as shown in FIG. 2, at time t1 to time t2, the data storage rate SR of the FIFO memory 13 increases with time. When the data storage rate SR reaches the predetermined upper limit Ro at time t2, the monitor unit 151 transmits the information that the data storage rate SR is the predetermined upper limit Ro to the parameter change unit 152. The parameter change unit 152 changes at least one of the ratio N and the variable CTS such that the read frequency fr can be raised. For example, the variable CTS is decreased by the correction value. As described above, the correction value of the variable CTS is set to have a constant ratio to the variable CTS. The frequency setting unit 153 sets the read frequency fr using the changed variable CTS. The clock generation unit 15 generates the reception end audio clock signal AC at the read frequency fr. The data read unit 16 reads the audio data AD from the FIFO memory 13 in synchronization with the reception end audio clock signal AC at the read frequency fr set using the changed variable CTS. As a result, the read rate becomes higher than the storage rate. Therefore, at and after time t2, the data storage rate SR decreases.

(d) When the data storage rate SR reaches the predetermined lower limit Ru at time t3, the monitor unit 151 transmits the information that the data storage rate SR is the predetermined lower limit Ru to the parameter change unit 152. The parameter change unit 152 changes at least one of the ratio N and the variable CTS such that the read frequency fr can decrease. For example, the variable CTS is increased by the correction value. The frequency setting unit 153 sets the read frequency fr using the changed variable CTS. The clock generation unit 15 generates the reception end audio clock signal AC at the read frequency fr. The data read unit 16 reads the audio data AD from the FIFO memory 13 in synchronization with the reception end audio clock signal AC at the read frequency fr set using the changed variable CTS. As a result, the read rate becomes lower than the storage rate. Therefore, at and after time t3, the data storage rate SR increases.

(e) When the data storage rate SR reaches the predetermined upper limit Ro at time t4, as in the case at time t2, the parameter change unit 152 changes at least one of the ratio N and the variable CTS such that the read frequency fr can be raised. Furthermore, when the data storage rate SR reaches the predetermined lower limit Ru at time t5, as in the case at t3, the parameter change unit 152 changes at least one of the ratio N and the variable CTS such that the read frequency fr can decrease. Afterwards, as described above, the data storage rate SR of the FIFO memory 13 can be maintained between the predetermined upper limit Ro and the predetermined lower limit Ru by the parameter change unit 152 changing the ratio N and the variable CTS as the clock parameters.

The predetermined upper limit Ro is set to a value between 100% and the start value Rb. The predetermined lower limit Ru is set to a value between 0% and the start value Rb. For example, when the start value Rb is 50%, the predetermined upper limit Ro is set to about 75%, and the predetermined lower limit Ru is set to about 25%. The correction value can be set to different values when the data storage rate SR reaches the predetermined upper limit Ro and when the data storage rate SR reaches the predetermined lower limit Ru.

In the explanation above, when the data storage rate SR of the FIFO memory 13 reaches the read start value at time t1, the clock generation unit 15 transmits the reception end audio clock signal AC at the read frequency fr to the data read unit 16, and the data read unit 16 starts reading the audio data AD stored in the FIFO memory 13. It is also possible that the data read unit 16 starts reading the audio data AD stored in the FIFO memory 13 when the clock generation unit 15 constantly transmits the reception end audio clock signal AC to the data read unit 16, and the data storage rate SR reaches the read start value.

An example of changing the variable CTS is explained above, but the ratio N can also be changed. As in the case of the correction value for a variable CTS, the correction value of the ratio N is set to have a constant ratio to the ratio N. Both ratio N and variable CTS can naturally be changed.

FIG. 2 shows the case in which the read rate determined by unchanged ratio N and variable CTS is lower than the storage rate. The timing chart shown in FIG. 3 shows the case in which the read rate determined by unchanged ratio N and variable CTS is higher than the storage rate.

Figure 3:
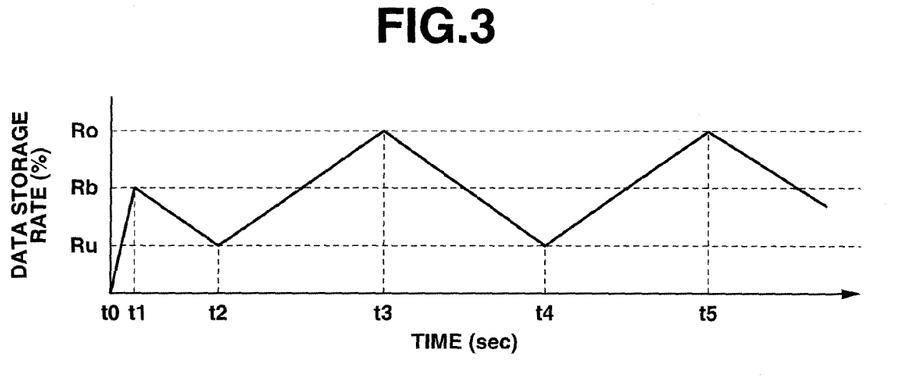
FIG. 3 is a timing chart for explanation of another example of an operation of the receiving system according to an embodiment of the present invention.

As shown in FIG. 3, when the data read unit 16 starts reading the audio data AD from the FIFO memory 13 at time t1, the data storage rate SR of the FIFO memory 13 decreases with time. When the data storage rate SR reaches the predetermined lower limit Ru at time t2, the parameter change unit 152 changes at least one of the ratio N and the variable CTS such that the read frequency fr can decrease. At time t3, when the data storage rate SR reaches the predetermined upper limit Ro, the parameter change unit 152 changes at least one of the ratio N and the variable CTS such that the read frequency fr can be raised. At the subsequent stages, the parameter change unit 152 changes both or one of the ratio N and the variable CTS as clock parameters, and adjusts the data storage rate SR of the FIFO memory 13.

Figure 4:
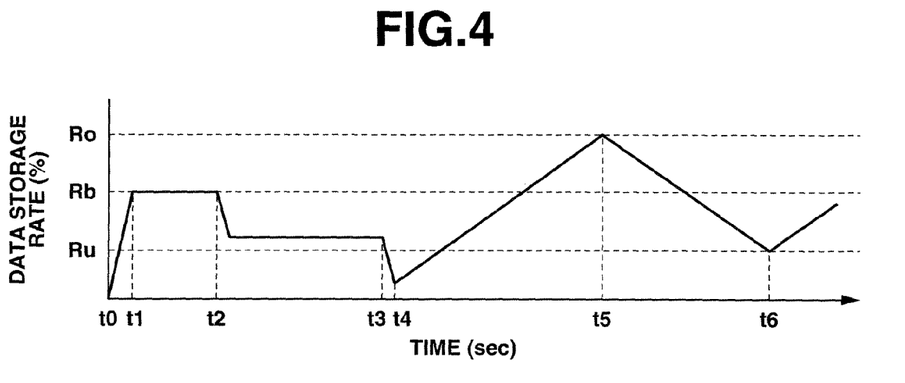
FIG. 4 is a timing chart for explanation of a further example of an operation of the receiving system according to an embodiment of the present invention.

FIG. 4 shows an example of a timing chart showing the case in which the transmission of the transmission signal T is temporarily suspended by a fault of the transmission system or other reasons, and the data storage rate SR of the FIFO memory suddenly decreases. The read rate and the storage rate determined by the unchanged ratio N and the variable CTS are assumed to match each other.

(a) After the transmission system 20 starts transmitting a transmission signal T to the receiving system 10 at time t0, the data read unit 16 starts reading the audio data AD from the FIFO memory 13 at time t1. Since the read rate determined by the unchanged ratio N and the variable CTS matches the storage rate, the data storage rate SR of the FIFO memory 13 maintains the start value Rb at and after time t1.

(b) When the transmission of the transmission signal T is temporarily suspended and the transmission recovers at time t2, the data storage rate SR of the FIFO memory 13 suddenly decreases during the suspension. However, since the data storage rate SR is higher than the predetermined lower limit Ru, no clock parameters are changed. Therefore, the read frequency fr is not changed, and the data storage rate SR maintains a constant value.

(c) At time t3, the transmission of the transmission signal T is suspended again, and the data storage rate SR of the FIFO memory 13 suddenly decreases. As a result, the data storage rate SR becomes lower than the predetermined lower limit Ru. Therefore, at time t4, the parameter change unit 152 changes at least one of the ratio N and the variable CTS such that the read frequency fr can decrease. Since the read frequency fc of the reception end audio clock signal AC decreases, the data storage rate SR of the FIFO memory 13 increases at and after time t4.

(d) When the data storage rate SR reaches the predetermined upper limit Ro at time t5, the parameter change unit 152 changes at least one of the ratio N and the variable CTS such that the read frequency fr can be raised. When the data storage rate SR reaches the predetermined lower limit Ru at time t6, the parameter change unit 152 changes at least one of the ratio N and the variable CTS such that the read frequency fr can decrease. Afterwards, the parameter change unit 152 likewise changes the ratio N and the variable CTS as clock parameters, and adjusts the data storage rate SR of the FIFO memory 13.

As explained above, with the receiving system 10 shown in FIG. 1, the data storage rate SR of the FIFO memory 13 is maintained between the predetermined upper limit Ro and the predetermined lower limit Ru. Therefore, no overflow or underflow of the FIFO memory 13 occurs. As a result, the degradation of the quality of regenerated audio can be prevented.

The receiving system shown in FIG. 1 can be loaded into one semiconductor integrated circuit (LSI). By integrating the functions of the receiving system shown in FIG. 1 into an LSI, the receiving system can be downsized.

FIRST VARIATION EXAMPLE

In the description above, an example of setting each of the predetermined upper limit Ro and the predetermined lower limit Ru is shown. However, it is also possible that a plurality of predetermined upper limits and a plurality of predetermined lower limits are set, and the parameter change unit 152 changes clock parameters using different correction values for each predetermined upper limit and predetermined lower limit.

Figure 5:
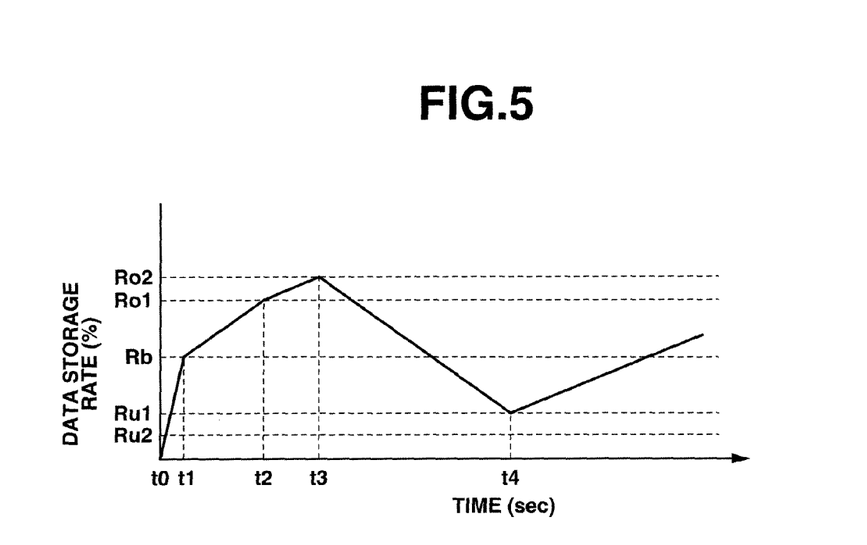
FIG. 5 is a timing chart for explanation of an example of an operation of the receiving system according to the first variation example of an embodiment of the present invention.

An example of an operation of the receiving system 10 in which a first predetermined upper limit Ro1, a second predetermined upper limit Ro2, a first predetermined lower limit Ru1, and a second predetermined lower limit Ru2 are set is explained below by referring to the timing chart shown in FIG. 5. FIG. 5 shows an example in which the read rate determined by unchanged ratio N and variable CTS is lower than the storage rate. The first predetermined upper limit Ro1 and the second predetermined upper limit Ro2 are set to a value between 100% and the start value Rb, and Ro1<Ro2. The first predetermined lower limit Ru1 and the second predetermined lower limit Ru2 are set to a value between 0% and the start value Rb, and Ru1>Ru2. For example, when the start value Rb is 50%, the first predetermined upper limit Ro1 is set to 75%, and the second predetermined upper limit Ro2 is set to 85%. Also, the first predetermined lower limit Ru1 is set to 25%, and the second predetermined lower limit Ru2 is set to 15%. An example of adjusting the read frequency fr by changing the variable CTS is explained below.

(a) After the transmission system 20 starts transmitting a transmission signal T to the receiving system 10 at time t0, the data read unit 16 starts reading the audio data AD from the FIFO memory 13 at time t1. Since the read rate determined by the unchanged ratio N and the variable CTS is lower than the storage rate, the data storage rate SR of the FIFO memory 13 increases with time at and after time t1. When the data storage rate SR reaches the first predetermined upper limit Ro1 at time t2, the parameter change unit 152 decreases the variable CTS by the first correction value such that the read frequency fr can be raised. The first correction value of the variable CTS is, for example, 0.01% of the variable CTS transmitted from the transmission system 20. The clock generation unit 15 generates the reception end audio clock signal AC at the read frequency fr calculated using a changed variable CTS. The data read unit 16 reads the audio data AD from the FIFO memory 13 in synchronization with the reception end audio clock signal AC at the read frequency fr set using the changed variable CTS.

(b) At time t2 to t3, the data storage rate SR of the FIFO memory 13 increases with time because the read rate determined by the changed variable CTS using the first correction value is lower than the storage rate. Although the data storage rate SR is to decrease with time if the read rate becomes higher than the storage rate by a change of the variable CTS by the first correction value at time t2, a change of the variable CTS using the first correction value results in the read rate lower than the storage rate (however, higher than the read rate at time t1 to t2), and therefore, the data storage rate SR moderately increases with time. When the data storage rate SR reaches the second predetermined upper limit Ro2 at time t3, the parameter change unit 152 decreases the variable CTS by the second correction value such that the read frequency fr can be raised. The second correction value of the variable CTS is set higher than the first correction value. For example, the second correction value of the variable CTS is 0.02% of the variable CTS transmitted from the transmission system 20. The data read unit 16 reads the audio data AD from the FIFO memory 13 in synchronization with the reception end audio clock signal AC at the read frequency fr set using the changed variable CTS. As a result, the read rate becomes higher than the storage rate, and at and after time t3, the data storage rate SR decreases.

(c) At time t4, when the data storage rate SR reaches the first predetermined lower limit Ru1, the parameter change unit 152 increases the variable CTS by the first correction value such that the read frequency fr can decrease. The frequency setting unit 153 sets the read frequency fr using the changed variable CTS. The clock generation unit 15 generates the reception end audio clock signal AC at the read frequency fr. The data read unit 16 reads the audio data AD from the FIFO memory 13 in synchronization with the reception end audio clock signal AC at the read frequency fr set using the changed variable CTS.

(d) At and after time t4, the data storage rate SR of the FIFO memory 13 increases with time because the read rate determined by the variable CTS changed using the first correction value is lower than the storage rate. Afterwards, in the similar manner, the parameter change unit 152 changes the variable CTS, and adjusts the data storage rate SR of the FIFO memory 13.

The timing chart shown in FIG. 5 shows an example in which the read rate determined by the unchanged ratio N and variable CTS is lower than the storage rate. When the read rate is higher than the storage rate, the data storage rate SR of the FIFO memory 13 decreases with time at and after time t1. When the data storage rate SR reaches the first predetermined lower limit Ru1 at time t2, the parameter change unit 152 increases the variable CTS by the first correction value such that the read frequency fr can decrease. However, when the read rate determined by the variable CTS changed using the first correction value is still higher than the storage rate, the data storage rate SR of the FIFO memory 13 continues to decrease with time. When the data storage rate SR reaches the second predetermined lower limit Ru2, the parameter change unit 152 increases the variable CTS by the second correction value such that the read frequency fr can further decrease. The data read unit 16 reads the audio data AD from the FIFO memory 13 in synchronization with the reception end audio clock signal AC at the read frequency fr set using the changed variable CTS. As a result, the read rate becomes lower than the storage rate, the data storage rate SR reaches the second predetermined lower limit Ru2, and subsequently the data storage rate SR increases. At time t4, when the data storage rate SR reaches the first predetermined upper limit Ro1, the clock parameters are decreased by the first correction value such that the read frequency can be raised, the data storage rate decreases with time, and subsequently the parameter change unit 152 similarly changes the variable CTS, and adjusts the data storage rate SR of the FIFO memory 13.

In the descriptions above, an example of changing a variable CTS is explained. It is also possible to change the ratio N. Furthermore, it is obvious that both the ratio N and the variable CTS can be changed. The first correction value can be different between the case where the data storage rate SR reaches the first predetermined upper limit Ro1 and the case where the data storage rate SR reaches the first predetermined lower limit Ru1. Furthermore, the second correction value can be different between the case where the data storage rate SR reaches the second predetermined upper limit Ro2 and the case where the data storage rate SR reaches the second predetermined lower limit Ru2.

As explained above, the receiving system 10 according to the first variation example of the embodiment of the present invention sets a plurality of predetermined upper limits and a plurality of predetermined lower limits, and the parameter change unit 152 sets a correction value for each of the predetermined upper limit and the predetermined lower limit. Therefore, when a clock parameter is changed using the first correction value set small such that the degradation of the quality of the generated audio can be low, an occurrence of an overflow or an underflow can be prevented in the FIFO memory 13 by changing a clock parameter using the second correction value set higher than the first correction value, even if the state in which an overflow or an underflow can easily occur in the FIFO memory 13. As a result, the degradation of the quality of regenerated audio can be suppressed.

SECOND VARIATION EXAMPLE

The operation of the receiving system 10 according to the second variation example of an embodiment of the present invention is different from the operation of the receiving system 10 explained above in that a change of the clock parameter is stopped when the data storage rate SR of the FIFO memory 13 is equal to a predetermined stop value Rs. Other operations are the same as those of the receiving system 10 explained above by referring to the timing chart shown in FIGS. 2 to 5.

Figure 6:
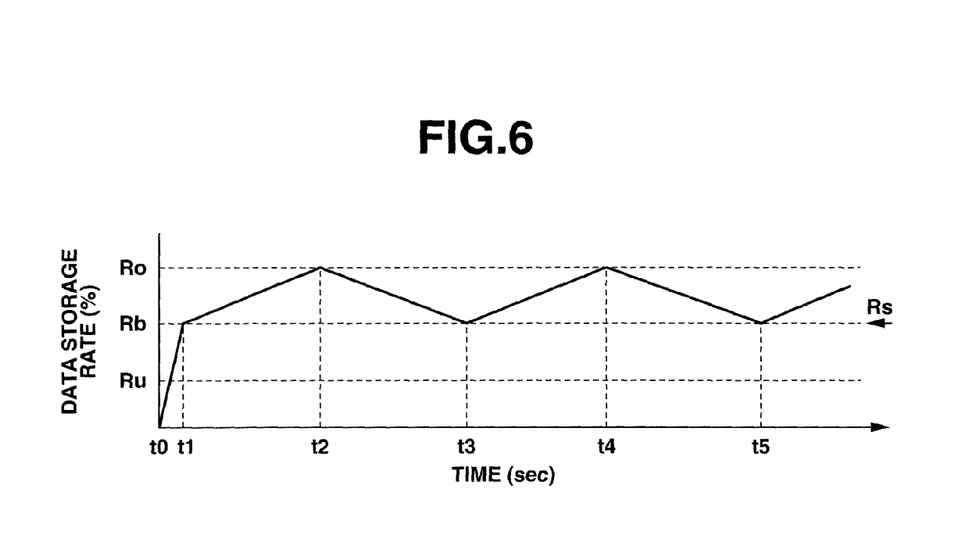
FIG. 6 is a timing chart for explanation of an example of an operation of the receiving system according to the second variation example of an embodiment of the present invention.

The example of the parameter change unit 152 stopping a change of a clock parameter when the data storage rate SR is a predetermined stop value Rs is explained below by referring to the timing chart shown in FIG. 6. FIG. 6 shows an example where the read rate determined by the unchanged ratio N and variable CTS is lower than the storage rate. Described below is the case where the read frequency fr is adjusted by changing the variable CTS.

(a) After the transmission system 20 starts transmitting a transmission signal T to the receiving system 10 at time t0, the data read unit 16 starts reading the audio data AD from the FIFO memory 13 at time t1. Since the read rate determined by the unchanged ratio N and the variable CTS is lower than the storage rate, the data storage rate SR of the FIFO memory 13 increases with time at and after time t1.

(b) When the data storage rate SR reaches the predetermined upper limit Ro at time t2, the parameter change unit 152 decreases the variable CTS by the correction value such that the read frequency fr can be raised. The clock generation unit 15 generates the reception end audio clock signal AC at the read frequency fr calculated using a changed variable CTS. The data read unit 16 reads the audio data AD from the FIFO memory 13 in synchronization with the reception end audio clock signal AC at the read frequency fr set using the changed variable CTS. As a result, the read rate becomes higher than the storage rate, and at and after time t2, the data storage rate SR decreases.

(c) At time t3, when the data storage rate SR reaches the predetermined stop value Rs, the parameter change unit 152 stops the change of the variable CTS. That is, the read frequency fr is set using as is the variable CTS and the ratio N contained in the transmission signal T. As a result, the read rate becomes lower than the storage rate, and the data storage rate SR increases again at and after time t3. Subsequently, the parameter change unit 152 similarly changes the variable CTS and stops the change, and adjusts the data storage rate SR of the FIFO memory 13.

In the description above, an example of changing the variable CTS is explained. It is also possible to change the ratio N, and it is obvious that both the ratio N and the variable CTS can be changed. The predetermined stop value Rs is set to a value between the predetermined upper limit Ro and the predetermined lower limit Ru, for example, to 50%. When the predetermined stop value Rs is 50%, and if the number of pieces of audio data that can be stored in the FIFO memory 13 is 128, then the parameter change unit 152 stops changing the clock parameters when the number of pieces of the audio data AD stored in the FIFO memory 13 reaches 64. FIG. 6 shows an example in which the start value Rb equals the predetermined stop value Rs.

FIG. 6 shows the case where the read rate determined by unchanged ratio N and variable CTS is lower than the storage rate. The timing chart shown in FIG. 7 shows the case in which the read rate determined by unchanged ratio N and variable CTS is higher than the storage rate.

Figure 7:
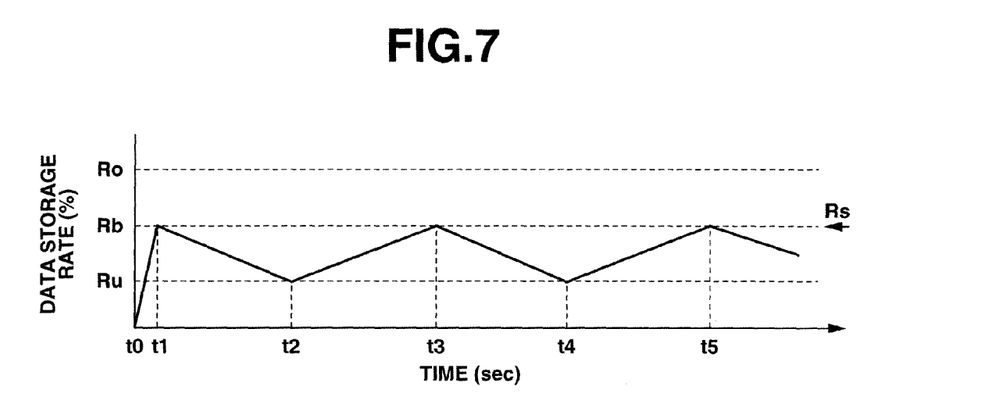
FIG. 7 is a timing chart for explanation of another example of an operation of the receiving system according to the second variation example of an embodiment of the present invention.

As shown in FIG. 7, when the data read unit 16 starts reading the audio data AD from the FIFO memory 13 at time t1, the data storage rate SR of the FIFO memory 13 decreases with time. When the data storage rate SR reaches the predetermined lower limit Ru at time t2, the parameter change unit 152 changes the ratio N and the variable CTS as clock parameters such that the read frequency fr can decrease. When the data storage rate SR reaches the predetermined stop value Rs at time t3, the parameter change unit 152 stops changing the clock parameters. As a result, the read frequency is set using the clock parameters included in the transmission signal as is, the read rate becomes higher than the storage rate, and the data storage rate decreases again at and after time t3. Subsequently, the parameter change unit 152 similarly changes the clock parameters and stops changing them, and adjusts the data storage rate SR of the FIFO memory 13.

Figure 8:
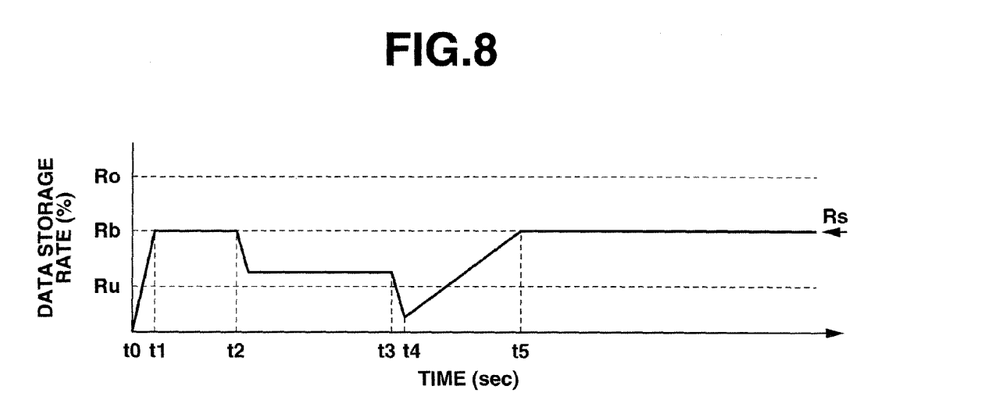
FIG. 8 is a timing chart for explanation of a further example of an operation of the receiving system according to the second variation example of an embodiment of the present invention.

FIG. 8 shows an example of a timing chart when the transmission of the transmission signal T is temporarily suspended by a fault of the transmission system or other reasons, and the data storage rate SR of the FIFO memory is suddenly decreased. It is assumed that the read rate determined by unchanged ratio N and variable CTS matches the storage rate.

(a) After the transmission system 20 starts transmitting a transmission signal T to the receiving system 10 at time t0, the data read unit 16 starts reading the audio data AD from the FIFO memory 13 at time t1. Since the read rate determined by the unchanged ratio N and the variable CTS matches the storage rate, the data storage rate SR of the FIFO memory 13 maintains the start value Rb at and after time t1.

(b) When the transmission of the transmission signal T is suspended, the data storage rate SR of the FIFO memory 13 suddenly decreases. However, since the data storage rate SR is higher than the predetermined lower limit Ru, no clock parameters are changed. Therefore, the read frequency fr is not changed, and the data storage rate SR maintains a constant value in a decreased state.

(c) At time t3, the transmission of the transmission signal T is suspended again, and the data storage rate SR of the FIFO memory 13 suddenly decreases. As a result, the data storage rate SR becomes lower than the predetermined lower limit Ru. Therefore, at time t4, the parameter change unit 152 changes at least one of the ratio N and the variable CTS as clock parameters such that the read frequency fr can decrease. Since the read frequency fc of the reception end audio clock signal AC decreases, the data storage rate SR of the FIFO memory 13 increases at and after time t4.

(d) When the data storage rate SR reaches the predetermined stop value Rs at time t5, the parameter change unit 152 stops changing the clock parameters. Since the read rate determined by the unchanged ratio N and variable CTS matches the storage rate, the data storage rate SR maintains the predetermined stop value Rs. FIG. 8 shows an example in which the start value Rb equals the predetermined stop value Rs.

As explained above, with the receiving system 10 according to the second variation example of the embodiment of the present invention, the data storage rate SR of the FIFO memory 13 is set to a value between the predetermined upper limit Ro or the predetermined lower limit Ru and the predetermined stop value Rs, or maintained at the predetermined stop value Rs. Therefore, as compared with the case where the data storage rate SR of the FIFO memory 13 is maintained at a value between the predetermined upper limit Ro and the predetermined lower limit Ru, the fluctuation of the read frequency fr is low. As a result, the quality of regenerated audio can be more effectively improved than in the case where the predetermined stop value Rs is not set.

Other Embodiments

In the explanation according to the above-mentioned embodiment of the present invention, an example is shown that the frequency of a transmission end audio clock signal is 128 times as high as the sampling frequency fs. However, the value is not limited to 128, for example, an integral multiple of 128 can also be used. Although an example of an HDMI transmission is explained above, the present invention can also be applied to a receiving system in a transmission method in which a clock signal for audio data is not directly transmitted, but the receiving system generates a clock signal for audio data using a parameter contained in a transmission signal, other than the HDMI transmission.

According to the above-mentioned embodiment of the present invention, a receiving system capable of preventing an occurrence of an overflow or an underflow in FIFO memory for storing data, and regenerating data contained in a transmission signal can be provided.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A receiving system, comprising:
a memory storing data contained in a transmission signal;
an extraction unit configured to extract a clock parameter contained in the transmission signal;
a parameter change unit configured to change the clock parameter in accordance with a result of a comparison between a data storage rate of the memory and a predetermined value;
a frequency setting unit configured to set a read frequency using the changed clock parameter; and
a data read unit configured to read the data from the memory in synchronization with a clock signal of the read frequency, wherein:
the parameter change unit keeps the clock parameter to maintain the data storage rate at a predetermined start value Rb at time t1, in case that a read rate determined by the read frequency calculated from the unchanged clock parameter contained in the transmission signal matches the data storage rate when data is read after the data is stored in the memory;
the parameter change unit keeps the clock parameter when the data storage rate is still higher than the predetermined lower limit Ru after the date storage rage of the memory suddenly decreases at time t2 due to temporary suspension of the transmission signal;
the parameter change unit changes the clock parameter to decrease the read frequency when the data storage rate becomes lower than a predetermined lower limit Ru at time t4 after the data storage rate is suddenly decreased at time t3 due to another temporary suspension of the transmission signal;

the parameter change unit changes the clock parameter to raise the read frequency when the data storage rate of the memory increases and the data storage rate reaches a predetermined upper limit Ro at time t5; and the parameter change unit changes the clock parameter to decrease the read frequency when the data storage rate reaches the predetermined lower limit Ru at time t6.

2. A receiving system, comprising:

a memory storing data contained in a transmission signal;

an extraction unit configured to extract a clock parameter contained in the transmission signal;

a parameter change unit configured to change the clock parameter in accordance with a result of a comparison between a data storage rate of the memory and a predetermined value;

a frequency setting unit configured to set a read frequency using the changed clock parameter; and a data read unit configured to read the data from the memory in synchronization with a clock signal of the read frequency, wherein:

a first predetermined upper limit Ro1 and a second predetermined upper limit Ro2 are set, the second predetermined upper limit Ro2 is bigger than the first upper limit Ro1, a first predetermined lower limit Ru1 and a second predetermined lower limit Ru2 are set, the second predetermined lower limit Ru2 is lower than the first lower limit Ru1;

the parameter change unit decreases the clock parameter by a first correction value to raise the read frequency when the data storage rate of the memory increases with time from the predetermined start value Rb at time t1 and the data storage rate reaches the first predetermined upper limit Ro1 at time t2, in case that the read rate determined by the read frequency calculated from the unchanged clock parameter contained in the transmission signal is lower than the data storage rate when data is read after the data is stored in the memory;

the parameter change unit decreases the clock parameter by a second correction value to raise further the read frequency when the data storage rate of the memory increase with time and data storage rate reaches the second predetermined upper limit Ro2 at time t3; and the parameter change unit increases the clock parameter by the second correction value to decrease the read frequency when the data storage rate decreases and the data storage rate reaches the first predetermined lower limit Ru1 at time t4.

3. A receiving system, comprising:

a memory storing data contained in a transmission signal;

an extraction unit configured to extract a clock parameter contained in the transmission signal;

a parameter change unit configured to change the clock parameter in accordance with a result of a comparison between a data storage rate of the memory and a predetermined value;

a frequency setting unit configured to set a read frequency using the changed clock parameter; and a data read unit configured to read the data from the memory in synchronization with a clock signal of the read frequency, wherein:

the parameter change unit has a function of stopping the change of the clock parameter when the data storage rate of the memory is a predetermined stop value Rs;

the parameter change unit changes the clock parameter to raise the read frequency when the data storage rate of the memory increases with time from a predetermined start value Rb at time t1, and the data storage rate reaches a predetermined upper limit Ro at time t2, in a case that a read rate determined by the read frequency calculated from the unchanged clock parameter contained in the transmission signal is lower than the data storage rate when data is read after the data is stored in the memory; and the parameter change unit stops changing the clock parameter when the data storage rate decreases at time t2 to t3 and the data storage rate reaches the predetermined stop value Rs at time t3, and sets the read frequency using the clock parameter contained in the transmission signal as is, to decrease the read rate to a value lower than the storage rate.

4. A receiving system, comprising:

a memory storing data contained in a transmission signal;

an extraction unit configured to extract a clock parameter contained in the transmission signal;

a parameter change unit configured to change the clock parameter in accordance with a result of a comparison between a data storage rate of the memory and a predetermined value;

a frequency setting unit configured to set a read frequency using the changed clock parameter; and a data read unit configured to read the data from the memory in synchronization with a clock signal of the read frequency, wherein:

the parameter change unit has a function of stopping the change of the clock parameter when the data storage rate of the memory is a predetermined stop value Rs;

the parameter change unit changes the clock parameter to decrease the read frequency when the data storage rate of the memory decreases with time from a predetermined start value Rb at time t1 and the data storage rate reaches a predetermined lower limit Ru at time t2, in a case that a read rate determined by the read frequency calculated from the unchanged clock parameter contained in the transmission signal is higher than the storage rate when data is read after the data is stored in the memory, and the parameter change unit stops changing the clock parameter when the data storage rate increases at time t2 to t3 and the data storage rate reaches the predetermined stop value Rs at time t3, and sets the read frequency using the clock parameter contained in the transmission signal as is, to increase the read rate to a value higher than the data storage rate.

* * * * *